(12) United States Patent
Haefli

(10) Patent No.: US 12,211,105 B2
(45) Date of Patent: *Jan. 28, 2025

(54) SYSTEM AND METHOD FOR ANALYZING A SURVIVABILITY OF A STRUCTURE BASED ON PROXIMATE OBJECTS

(71) Applicant: STATE FARM MUTUAL AUTOMOBILE INSURANCE COMPANY, Bloomington, IL (US)

(72) Inventor: Eric Haefli, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/376,086

(22) Filed: Oct. 3, 2023

(65) Prior Publication Data

US 2024/0029172 A1   Jan. 25, 2024

Related U.S. Application Data

(63) Continuation of application No. 17/724,789, filed on Apr. 20, 2022, now Pat. No. 11,816,739, which is a
(Continued)

(51) Int. Cl.
*G06Q 40/08* (2012.01)
*G06F 16/53* (2019.01)
(Continued)

(52) U.S. Cl.
CPC ............. *G06Q 40/08* (2013.01); *G06F 16/53* (2019.01); *G06F 16/73* (2019.01); *G06T 7/11* (2017.01);
(Continued)

(58) Field of Classification Search
CPC ......... G06Q 40/08; G06F 16/53; G06F 16/73; G06F 16/5854; G06F 16/7837;
(Continued)

(56) References Cited

U.S. PATENT DOCUMENTS 9,964,519 B2   5/2018   Goroshevskiy et al.
10,311,302 B2  6/2019   Kottenstette et al.
(Continued)

OTHER PUBLICATIONS

Office Action for U.S. Appl. No. 16/996,885, mailed on Oct. 13, 2021.

*Primary Examiner* — Charlotte M Baker
(74) *Attorney, Agent, or Firm* — MARSHALL, GERSTEIN & BORUN LLP

(57) ABSTRACT

A computer-implemented method for analyzing a survivability of a structure is presented. A distance extending radially from the structure defining an area surrounding the structure may be determined. The area surrounding the structure may be scanned to identify surrounding objects. The area surrounding the structure may then be segmented to create a plurality of area segments. A density of surrounding objects in each of the plurality of area segments may be determined. A risk score for each of the plurality of area segments may then be determined based on the density of surrounding objects in each of the plurality of area segments. An overall wind exposure risk value may be provided for further use.

20 Claims, 4 Drawing Sheets

Related U.S. Application Data continuation of application No. 16/996,885, filed on Aug. 18, 2020, now Pat. No. 11,348,184, which is a continuation of application No. 16/248,369, filed on Jan. 15, 2019, now Pat. No. 10,825,100.

(51) Int. Cl.
*G06F 16/73* (2019.01)
*G06T 7/11* (2017.01)
*G06V 20/10* (2022.01)
*G06N 20/00* (2019.01)

(52) U.S. Cl.
CPC .......... *G06V 20/176* (2022.01); *G06V 20/188* (2022.01); *G06N 20/00* (2019.01); *G06T 2207/10032* (2013.01); *G06T 2207/20021* (2013.01); *G06T 2207/30184* (2013.01); *G06T 2207/30188* (2013.01)

(58) Field of Classification Search
CPC ............ G06T 7/11; G06T 2207/10032; G06T 2207/20021; G06T 2207/30184; G06T 2207/30188; G06V 20/176; G06V 20/188; G06V 20/17; G06N 20/00
USPC .......................................................... 705/4
See application file for complete search history.

(56) References Cited

U.S. PATENT DOCUMENTS

| | | | |
|---|---|---|---|
| 10,330,641 | B2 | 6/2019 | Goroshevskiy et al. |
| 10,366,288 | B1 | 7/2019 | Kottenstette et al. |
| 10,592,554 | B1 | 3/2020 | Merritt |
| 10,620,084 | B2 | 4/2020 | Santarone et al. |
| 10,643,072 | B2 | 5/2020 | Kottenstette et al. |
| 10,657,604 | B2 | 5/2020 | Fiete et al. |
| 11,151,378 | B2 | 10/2021 | Kottenstette et al. |
| 11,210,552 | B2 | 12/2021 | Kossyk et al. |
| 11,222,426 | B2 | 1/2022 | Richter et al. |
| 11,232,150 | B2 | 1/2022 | Vianello et al. |
| 11,367,265 | B2 | 6/2022 | Vianello et al. |
| 2009/0204444 | A1 | 8/2009 | Tucker et al. |
| 2018/0276759 | A1 | 9/2018 | Schoen et al. |
| 2019/0369057 | A1* | 12/2019 | Mattar ................. G01N 29/265 |
| 2020/0019167 | A1* | 1/2020 | Alshamrani ........... G05D 1/101 |
| 2020/0033312 | A1* | 1/2020 | Overton ................ G06T 7/0012 |

\* cited by examiner

SYSTEM AND METHOD FOR ANALYZING A SURVIVABILITY OF A STRUCTURE BASED ON PROXIMATE OBJECTS

CROSS-REFERENCE TO RELATED APPLICATION

This application is a continuation of U.S. patent application Ser. No. 17/724,789, entitled "System and Method for Analyzing a Survivability of a Structure Based on Proximate Objects," filed on Apr. 20, 2022, which is a continuation of U.S. patent application Ser. No. 16/996,885, entitled "System and Method for Analyzing a Survivability of a Structure Based on Proximate Objects," filed on Aug. 18, 2020, which is a continuation of U.S. patent application Ser. No. 16/248,369, entitled "System and Method for Analyzing a Survivability of a Structure Based on Proximate Objects," filed on Jan. 15, 2019, the disclosures of which are hereby incorporated herein by reference.

FIELD OF THE DISCLOSURE

The present disclosure generally relates to determining structure survivability of buildings and other structures with respect to wind damage and, more particularly, to a system and method for analyzing a survivability of a structure based on proximate objects.

BACKGROUND

A structure may be damaged due to various environmental factors. Perhaps the most common form of structural damage is that caused by wind. Thus, assessing a structure's vulnerability to wind damage is useful in understanding the risk wind poses to the structure.

Conventional techniques to assess a structure's vulnerability to wind damage consider the integrity of the structure. For example, if the structure has loose roof shingles or damaged window seals, the structure is considered more vulnerable to wind damage. However, these conventional techniques provide a limited amount of useful information for the purposes of assessing a structure's vulnerability to wind damage because they ignore the effects of other objects in the local environment on channeling or diverting wind. Additionally, the conventional techniques have limited flexibility in the breadth of information used in making their assessments.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a computer-implemented method for analyzing the survivability of a structure may be provided. The method may include determining a distance extending radially from the structure to define an area surrounding the structure; scanning the area surrounding the structure to identify surrounding objects; segmenting the area surrounding the structure to create a plurality of area segments; determining a density of surrounding objects equal to or greater in height compared to the structure in each of the plurality of area segments; determining a risk score for each of the plurality of area segments, which risk score may be based on the density of surrounding objects equal to or greater in height compared to the structure in each of the plurality of area segments; providing an overall wind exposure risk value to a user of a computing device; and/or updating an aspect of an insurance policy based on the overall wind exposure risk value.

In another embodiment, a computer device for analyzing a survivability of a structure may be provided. The computer device may include one or more processors and one or more memories coupled to the one or more processors. The one or more memories may include non-transitory computer executable instructions stored therein. The non-transitory computer executable instructions, when executed by the one or more processors, may cause the computer device to determine a distance extending radially from the structure to define an area surrounding the structure; scan the area surrounding the structure to identify surrounding objects; segment the area surrounding the structure to create a plurality of area segments; determine a density of surrounding objects equal to or greater in height compared to the structure in each of the plurality of area segments; determine a risk score for each of the plurality of area segments, which risk score may be based on the density of surrounding objects equal to or greater in height compared to the structure in each of the plurality of area segments; provide an overall wind exposure risk value to a user of a computing device; and/or updating an aspect of an insurance policy based on the overall wind exposure risk value.

In yet another embodiment, a computer readable storage medium may be provided that includes non-transitory computer readable instructions stored thereon for analyzing a survivability of a structure. The instructions, when executed on one or more processors, may cause the one or more processors to determine a distance extending radially from the structure to define an area surrounding the structure; scan the area surrounding the structure to identify surrounding objects; segment the area surrounding the structure to create a plurality of area segments; determine a density of surrounding objects equal to or greater in height compared to the structure in each of the plurality of area segments; determine a risk score for each of the plurality of area segments, which risk score may be based on the density of surrounding objects equal to or greater in height compared to the structure in each of the plurality of area segments; provide an overall wind exposure risk value to a user of a computing device; and/or updating an aspect of an insurance policy based on the overall wind exposure risk value.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

Figure 1:
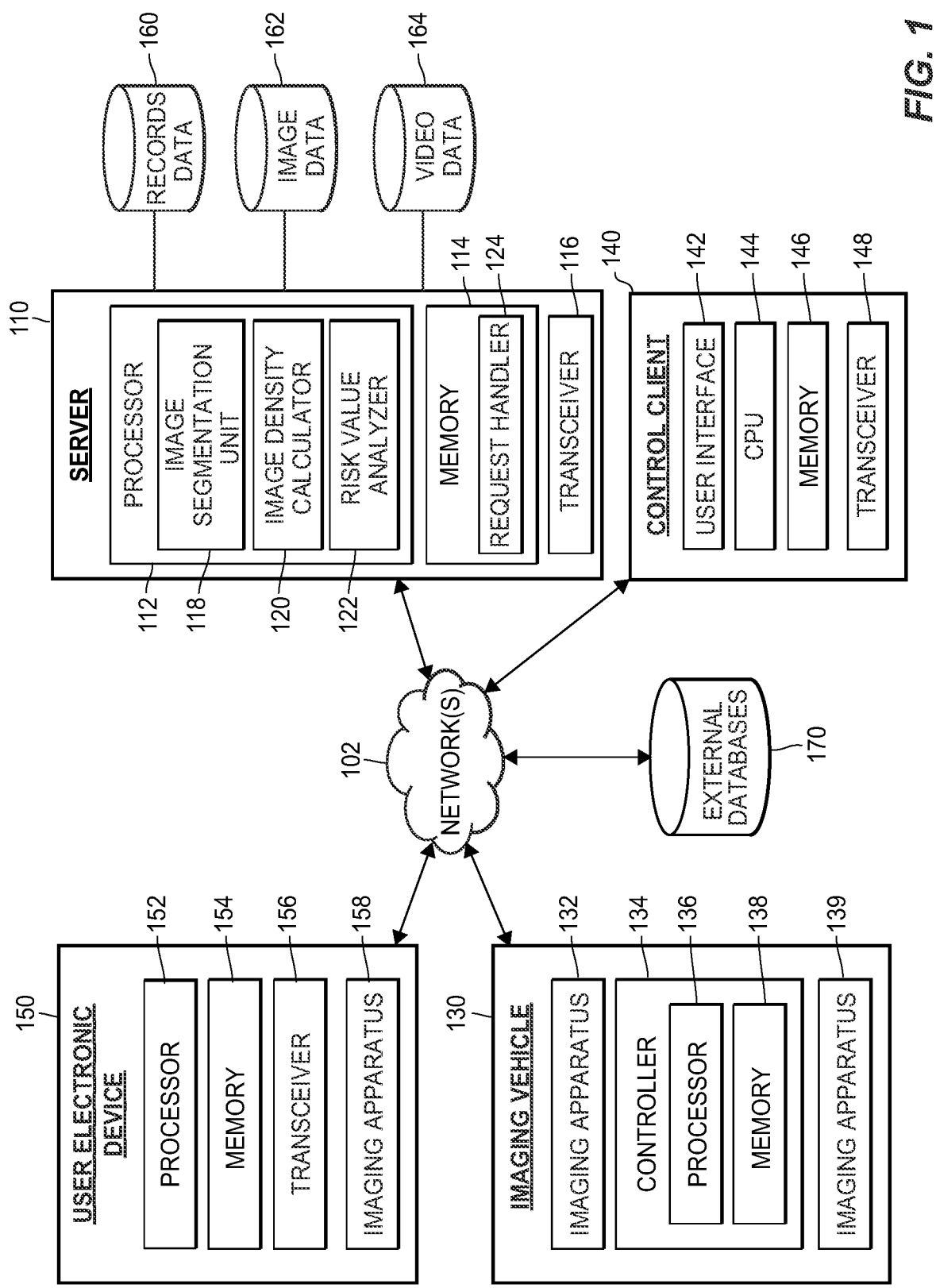
FIG. 1 illustrates an example system for analyzing a survivability of a structure.

The figures depict various aspects of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning.

I. Example Analyzing a Survivability of a Structure

The present embodiments relate to, inter alia, a system and method for analyzing a survivability of a structure. More particularly, a distance extending radially from the structure to define an area surrounding the structure may be determined. The distance's radius from the structure may be, for example, about 1,500 feet. It should be understood that the distance may be any suitable distance for analyzing a survivability of a structure. Moreover, the area surrounding the structure may comprise a circle, but it may comprise any shape or configuration suitable for analyzing the survivability of a structure. For example, in some embodiments, a square or rectangular area surrounding the structure may be used for computational simplicity.

The area surrounding the structure may then be scanned to identify surrounding objects that are of sufficient size and shape to affect airflow near the structure (e.g., by blocking, diverting, or channeling wind). The surrounding objects may include trees and buildings, but it may include other objects located in the area surrounding the structure.

The area surrounding the structure may then be segmented to create a plurality of area segments. If the area surrounding the structure comprises a circle, the plurality of area segments may include, for example, eight forty-five degree pie segments of equal area. However, the area surrounding the structure may be subdivided into any number of segments, and the segments may comprise any shape and need not all be equivalent in size or shape.

A density of surrounding objects in each of the plurality of area segments may then be determined. For each respective area segment of the plurality of area segments, the density of surrounding objects may only include surrounding objects of equal or greater height than the structure. In some embodiments, the density may be determined as a count of the objects, as a percentage of the area segment occupied by the objects, or a number of objects per unit area of the area segment.

A risk score for each of the plurality of area segments may then be determined. The risk score may be based on the density of surrounding objects of equal or greater height relative to the structure in each of the plurality of area segments. Specifically, the risk score for each of the plurality of area segments may be based on the height of all surrounding objects of equal or greater height than the structure. Additionally, the density of surrounding objects for a respective area segment of the plurality of area segments may be inversely proportional to the risk score for the respective area segment.

However, the risk score for each of the plurality of area segments may be weighted based on certain factors. For example, the risk score for each of the plurality of area segments may be weighted according to at least one of the one or more historic wind patterns associated with a geographic region of the structure and a spacing from the structure of the surrounding objects.

An overall wind exposure risk value may be provided to a user of a computing device, such as an owner of the structure or a prospective insurance provider. The overall wind exposure risk value may be based on a combination of the risk scores for each of the plurality of area segments.

By providing a system and method that allow analyzing a survivability of a structure as described above and further detailed below, various advantages are achieved. For example, the system and method provide and/or are implemented through the use of a device(s) that provide information particularly suited for use with other features of the system and method to analyze a survivability of a structure. Other advantages will be recognized by one of ordinary skill in the art in light of the teaching and disclosure herein.

II. Example System and Related Functionality

FIG. 1 illustrates an example system 100 for analyzing a survivability of a structure. The example system 100 may include a network 102. The network 102 may be a computer network of an insurance provider (e.g., provided or used by the insurance provider or communications over which the insurance provider otherwise controls or facilitates).

The system may further include a server 110. The server 110 may include a processor 112 which includes an image segmentation unit 118, an image density calculator 120, and a risk value analyzer 122. The server 110 may further include a memory 114, which includes a request handler 124, and a transceiver 116. The server may be communicatively coupled to other servers or databases, such as, the records database 160, the image database 162, the video database 164, or other external databases 170 as shown in FIG. 1.

In embodiments where, as noted above and as further discussed below, the overall wind exposure risk value is provided to a prospective insurance provider, the prospective insurance provider may receive this indication at the server 110. The server 110, in some embodiments, may also make available for download (e.g., via the network 102) the application executed by the user electronic device 150 to implement functionality described herein. It will be appreciated that server 110 may be a server provided by or used by the insurance provider, or use of which the insurance provider otherwise controls or facilitates.

The system 100 may further include an imaging vehicle 130. The imaging vehicle 130 may contain an imaging apparatus 132, a controller 134, and a transceiver 139. The controller 134 may include a processor 136 and a memory 138. The memory 138 may store computer-executable instructions, which may be executed by the processor 136. As shown in FIG. 1, the imaging vehicle 130 may have a single imaging apparatus 132, or the imaging vehicle 130 may include a number of imaging apparatuses. For example, the imaging vehicle 130 may be configured to take images with both three dimensional and two dimensional imagers. Additionally, the imaging vehicle 130 may be configured to take images across a number of spectrum bandwidths (e.g., visible, IR, UV, etc.).

Furthermore, the imaging vehicle 130 may be configured to capture an aerial image of a structure of interest. In this embodiment, the imaging vehicle 130 may capture an aerial image large enough to perform the analysis described herein. The imaging vehicle 130 may include any physical embodiment sufficient to capture such an aerial image (e.g., drone, imaging satellite, imaging plane).

The system may further include a control client 140 configured to control the imaging vehicle 130, should a real-time inspection be requested or desired. For example, if the imaging requested or necessitated in an inspection to analyze the survivability of a structure includes utilizing a drone to capture aerial images of the structure of interest, a user may control the imaging vehicle 130 (i.e., the drone) via the control client 140 to capture the necessary images. Additionally, the necessary images or data may be acquired by using government databases (e.g., external databases 170) which include remote sensed imagery. The control client 140 also includes a user interface 142, a CPU 144, a memory 146, and a transceiver 148. The memory 146 may store computer-executable instructions, which may be executed by the CPU 144.

The system may further include a user electronic device 150. The user electronic device 150 may include a processor 152, a memory 154, a transceiver 156, and an imaging apparatus 158. The memory 154 may store computer-executable instructions, which may be executed by the processor 152. In certain embodiments, the user electronic device 150 may be configured to receive communications from the server 110, the control client 140, or the imaging vehicle 130 before, during, or after an analysis of the survivability of a structure has taken place. For example, the user electronic device 150 may be configured to receive live video footage from the imaging vehicle 130 of the image capturing process.

In various embodiments, the user electronic device 150 may be configured to capture images of the structure of interest or the area surrounding the structure of interest. The user electronic device 150 may execute computer-executable instructions, such as a mobile application, that allow the actions described herein to be implemented. For example, if the user electronic device 150 is a smartphone, the user may capture images with the imaging apparatus 158 to transmit through the network 102 to the server 110 for processing. The user electronic device 150, and each of the computing devices referred to herein, may be any suitable computing device such as, but not limited to, a desktop computer, a laptop computer, a mobile phone such as a smart phone, a tablet, a phablet, smart glasses, other wearable computing device(s), etc. Moreover, it should be appreciated that the system 100 may be configured to process real-time footage of an area surrounding the structure of interest 304 (e.g., video footage captured by the user electronic device 150 or imaging vehicle 130, or live streaming footage from any suitable device), in addition to a still image.

In various embodiments, processors of the user electronic device 150 and other devices, such as the server 110, may execute instructions to transmit data to, receive data from, or otherwise communicate with devices of the example system 100 via the network 102 as further described below. The network 102 may be or may include a network such as the Internet and/or any other type of suitable network (e.g., a local area network (LAN), a metropolitan area network (MAN), a wide area network (WAN), a mobile network, a wired or wireless network, a private network, a virtual private network, etc.). The network 102 may also or alternatively be or include one or more cellular networks such as code division multiple access (CDMA) network, GSM (Global System for Mobile Communications) network, WiMAX (Worldwide Interoperability for Microwave Access) network, Long Term Evolution (LTE) network, etc.

As further described below, the example system 100 allows analyzing a survivability of a structure, and allows, among other advantages, determination of an overall wind exposure risk value for the structure based on particular information obtained from scanning the area surrounding the structure.

III. Example Operation of System

Figure 2:
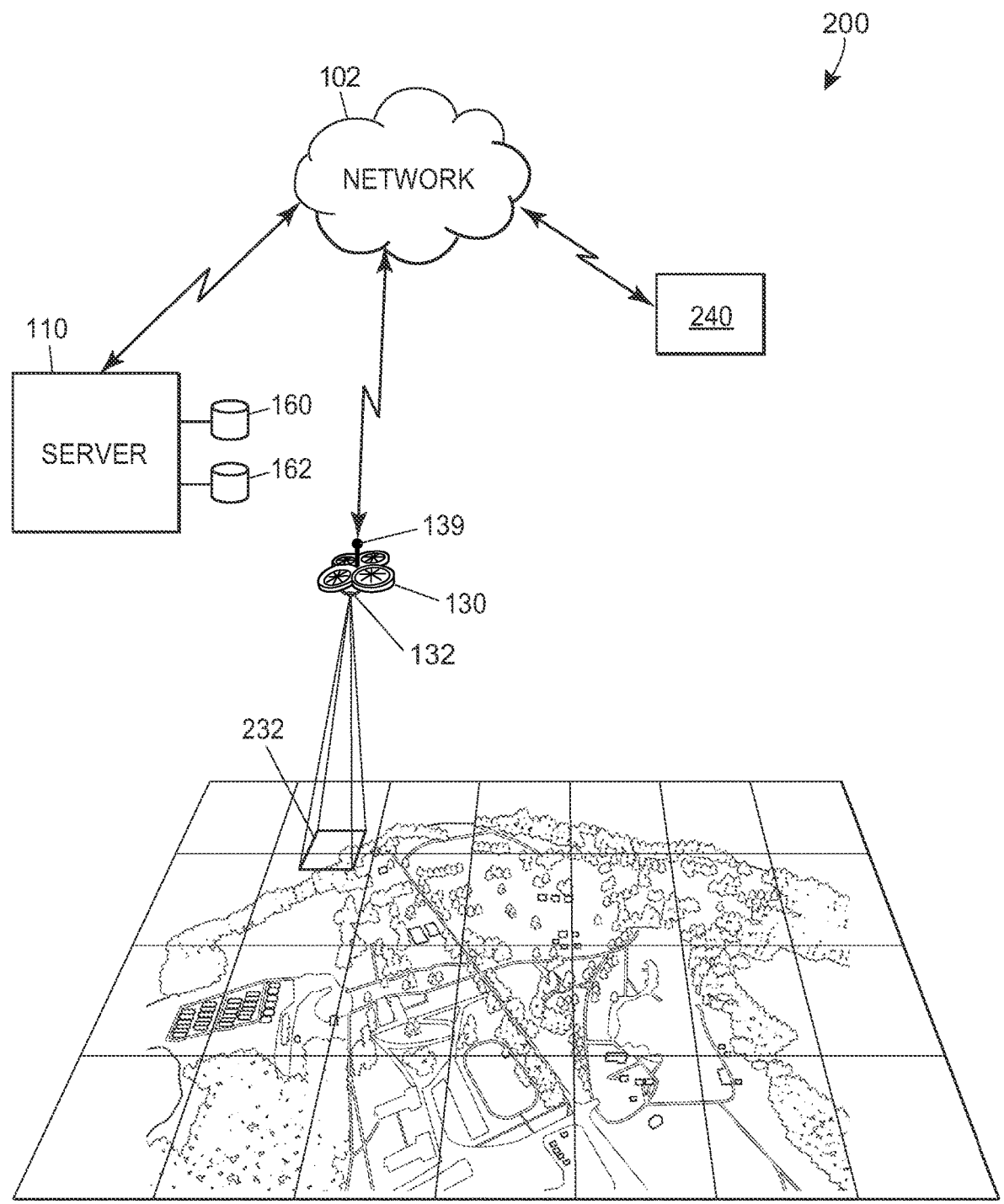
FIG. 2 illustrates an example operational embodiment of, for example, the system of FIG. 1.

FIG. 2 illustrates an example operational embodiment 200 of, for example, the system 100 of FIG. 1. The example operational embodiment 200 may include the network 102, the server 110, and the imaging vehicle 130. The server 110 may also include the records database 160 and the image database 162, as previously mentioned in reference to FIG. 1.

The imaging vehicle 130 may include the imaging assembly 132 and the transceiver 139. The imaging assembly may be configured to capture images in an optical field of view (FOV) 232. As illustrated in FIG. 2, the imaging vehicle may be a drone configured to capture an aerial image of an area defined by the optical FOV 232. In various embodiments, the optical FOV 232 may define a circular area with a radius extending from the center of the circular area.

As illustrated in FIG. 2, and as further discussed herein, the imaging vehicle 130 may capture an image via the imaging assembly 132, and based on the optical FOV 232. The captured image may then be transmitted by the transceiver 139 through the network 102 to the server 110 for image processing (e.g., at the processor 112). The image may also be transmitted to an external connected device 240.

The example operational embodiment 200 may further include an external connected device 240. The external connected device 240 may be a server or database containing any number of processors, memories, or other suitable components. It should be appreciated that the external connected device 240 may be any number of devices connected to the network 102. For example, the external connected device 240 may be the user electronic device 150 and the control client 140, as discussed in reference to FIG. 1.

It should be appreciated that although FIG. 2 depicts the imaging vehicle 130 as a drone, the imaging vehicle 130 may be any vehicle or device configured to transmit an image (or live footage or recorded video) of the structure of interest to the server 110 or other external connected device 240 through the network 102.

Figure 3:
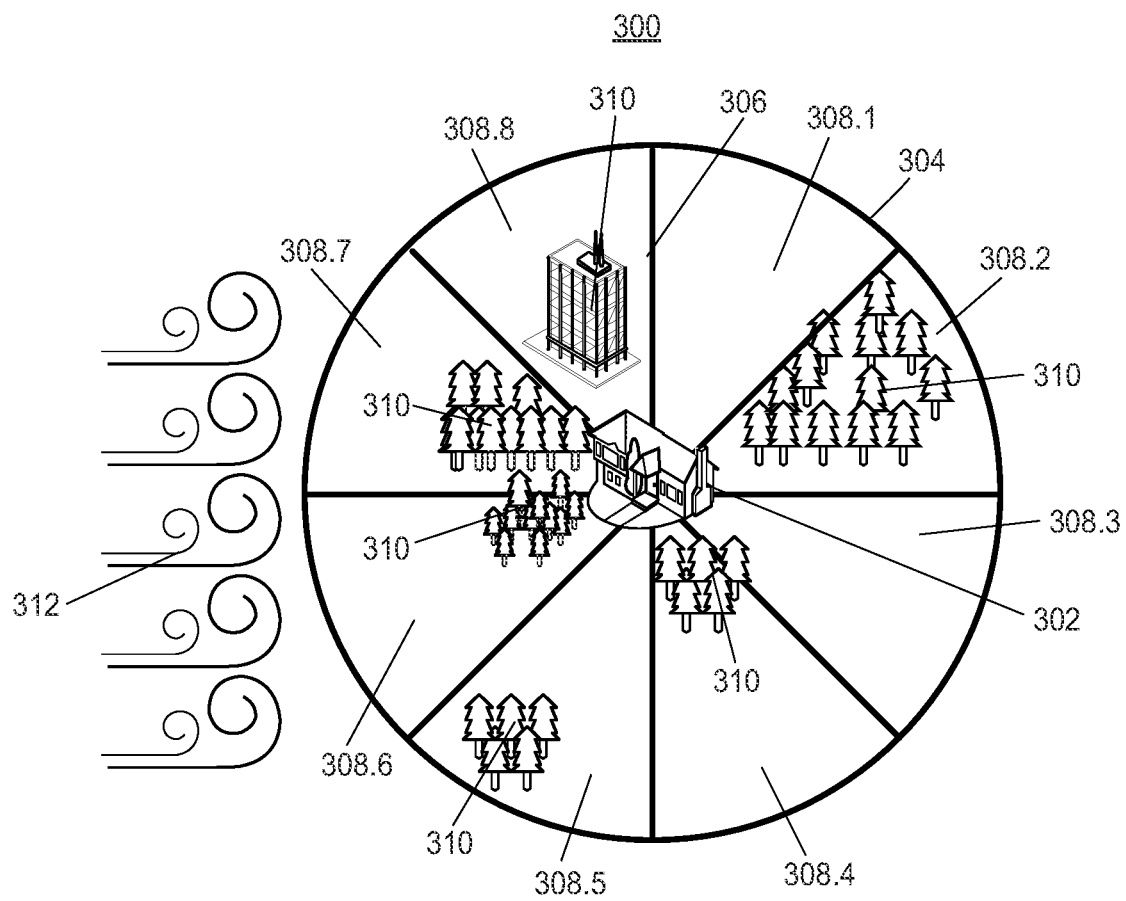
FIG. 3 illustrates an example operational embodiment of a method for analyzing a survivability of a structure.

IV. Example Operational Embodiment of a Method for Analyzing a Survivability of a Structure FIG. 3 illustrates an example operational embodiment 300 of a method for analyzing a survivability of a structure. As further discussed herein, after one or more images of the structure of interest 304 or the surrounding area have been captured and sent to the server 110 for processing, the image is analyzed to ultimately determine a wind exposure risk value. It should be understood, and as previously mentioned, the processing may additionally take place at the imaging vehicle 130, user electronic device 150, or any other suitable device containing image processing capabilities. Further, the image to be analyzed may be taken by an imaging vehicle 130 or user electronic device 150, as described above, or may be retrieved from an image and/or video database or server (e.g., image database 162 and/or video database 164).

The example operational embodiment 300 may include a surrounding area 304, which may define a ground area along the surface of the earth that partially or fully surrounds the structure of interest 302. The surrounding area may encompass the structure of interest 302. In various embodiments, the surrounding area 304 may be a circle which has its center at the base of the structure of interest 302. In this embodiment, the surrounding area 304 may include a distance 306 from the structure of interest 302. This distance 306 may define the radius of the circle defining the surrounding area 304. In various other embodiments, the distance 306 may be about 600 feet or 1,500 feet, but it should be understood that the distance 306 may be any length suitable to analyze a survivability of the structure of interest 302. Alternatively, in other embodiments, the surrounding area 304 may not be a circle, and the structure of interest 302 may not be in the center of the surrounding area 304.

The example operational embodiment 300 may further include a plurality of area segments, illustrated in FIG. 3 as elements 308.1-308.8. In various embodiments, the plurality of area segments 308.1-308.8 may be eight, equal-area segments. For example, if the surrounding area 304 is a circle, the plurality of area segments 308.1-308.8 may each include a 45° arc of the circle. Alternatively, the plurality of area segments 308.1-308.8 may be any size or shape, and they may each be a different size or shape (i.e., non-uniform). Additionally, there may be any number of respective area segments in the plurality of area segments 308.1-308.8 sufficient to analyze a survivability of a structure. Although illustrated as each stretching from the structure of interest 302 to the outer circle of the surrounding area 304, the plurality of area segments 308.1-308.8 may, in further embodiments, include interior area segments that cover an area up to a first distance from the structure of interest 302 and exterior area segments that cover an area from the first distance to the distance 306. Such interior and exterior area segments may be used to account for distance of objects 310 from the structure of interest 302.

The plurality of area segments 308.1-308.8 may include surrounding objects, as illustrated in FIG. 3 in area segments 308.2 and 308.4-308.8. In various embodiments, the surrounding objects may include buildings and trees. It should be understood that the surrounding objects may include any objects sufficient to influence the analysis of a survivability of a structure, as discussed further herein, by affecting airflow patterns in the vicinity of the structure.

The example operational embodiment 300 may further include one or more historic wind patterns 312. In various embodiments, the one or more historic wind patterns 312 may be indicative of wind patterns associated with a particular geographic region. In these embodiments, the particular geographic region may include the structure of interest 302.

IV. Example Method for Analyzing a Survivablitiy of a Structure

Figure 4:
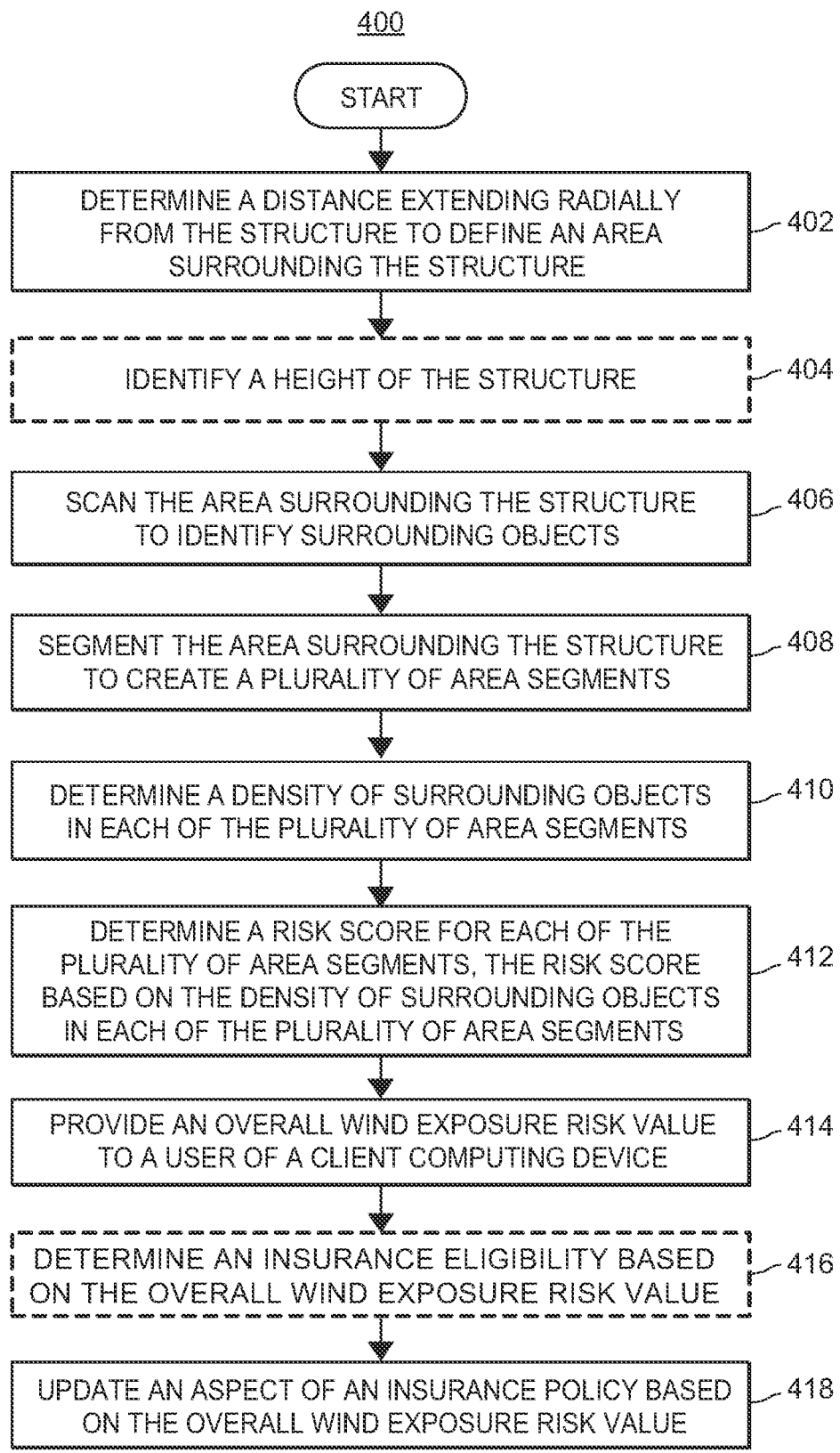
FIG. 4 is a flow chart of an example method, routine, or process for analyzing the survivability of a structure.

FIG. 4 is a flow chart of an example method, routine, or process 400 for analyzing the survivability of a structure. The example method, routine, or process 400 begins at block 402 by determining a distance extending radially from the structure to define an area surrounding the structure. For example, and in reference to FIG. 3, the distance may be the distance 306, the structure may be the structure of interest 302, and the area surrounding the structure may be the surrounding area 304. In this example, one or more processors via a computer network (e.g., processor 112 and network 102) may analyze an image or other suitable visual representation of the structure of interest 302 to determine which area of the image or other suitable visual representation defines the surrounding area 304. Further in this example, the one or more processors may define the distance 306 from the structure of interest 302. Finally in this example, the one or more processors create a region encompassing the structure of interest 302 using the distance 306 as the radius of a circle which the one or more processors define as the surrounding area 304. In various embodiments, and as previously mentioned, the distance 306 may be about 1,500 feet. In other embodiments, and as previously mentioned, the surrounding area 304 may be any shape or size.

Additionally, at block 402, the one or more processors may determine one or more historic wind patterns, illustrated in FIG. 3 as 312, for the geographic region associated with the structure of interest 302. The one or more processors may determine the one or more historic wind patterns 312 by accessing a server or database of the system 100 (e.g., server 110), or may be accessed by the one or more processors through an external server or database (e.g., external databases 170).

Optionally, at block 404, the one or more processors may identify the height of the structure of interest 302. The one or more processors may determine the height of the structure of interest 302 by determining the peak roof height of the structure of interest 302, the mean roof height of the structure of interest 302, or any other suitable metric.

At block 406, and in reference to FIG. 3, the one or more processors may scan the surrounding area 304 to identify surrounding objects. The scanning techniques employed by the one or more processors may include any suitable technique or combination of techniques for analyzing an image (e.g., edge detection, color analysis, machine learning, pixel counting, thresholding, filtering, stitching, or any other suitable technique). In various embodiments, the surrounding objects may include trees and buildings, which are the most frequently occurring objects capable of significantly affecting airflow in most environments. In further embodiments, the one or more processors may identify various characteristics corresponding to the surrounding objects. It should be understood that the surrounding objects may be any object suitable to influence the analysis of survivability of a structure. Additionally, the one or more processors may be programmed to search for pre-determined characteristics of identified surrounding objects, or alternatively, the one or more processors may make adaptive decisions about which characteristics to identify for each respective identified surrounding object.

For example, the one or more processors may scan the surrounding area 304 and identify a number of surrounding objects including, in reference to FIG. 3, the trees illustrated in area segments 308.2 and 308.4-308.7, and the building illustrated in area segment 308.8. In some embodiments, the one or more processors may also identify characteristics such as the height, area, volume, mass, number of branches, age, or health of the trees illustrated in area segments 308.2 and 308.4-308.7, or similar height, volume, or age of the building illustrated in area segment 308.8. Additionally, the one or more processors may access records associated with buildings, such as the building illustrated in area segment 308.8, to determine other relevant information like inspection records. This information may be stored on a server or database of the system 100 (e.g., server 110), or may be accessed by the one or more processors through an external server or database (e.g., external databases 170). Additionally, the one or more processors may identify a spacing of the surrounding objects relative to the structure of interest 302 and/or identify the heights of the surrounding objects.

At block 408, and in reference to FIG. 3, the one or more processors may segment the surrounding area 304 into a plurality of area segments 308.1-308.8. In the example illustrated in FIG. 3, and in various embodiments herein, the plurality of area segments may include eight equal-area segments. In this example, if the surrounding area 304 is a circle, the plurality of area segments 308.1-308.8 may each include a 45° arc of the circle. In various embodiments, the one or more processors may segment the surrounding area 304 into a pre-determined number of area segments of a pre-determined size and shape. Alternatively, the one or more processors may make adaptive decisions concerning the number, shape, size, or any other characteristic or combination thereof concerning the plurality of area segments. Additionally, each respective area segment may be non-uniform in regard to shape, size, or any other characteristic with respect to every other respective area segment of the plurality of area segments.

At block 410, and in reference to FIG. 3, the one or more processors may determine a density of surrounding objects in each of the plurality of area segments 308.1-308.8. In the example illustrated in FIG. 3, the one or more processors may analyze each of the plurality of area segments 308.1-308.8 to determine a density of surrounding objects within the surrounding area 304. If the height of the surrounding objects is considered when evaluating the density of surrounding objects, then in various embodiments, only those surrounding objects with heights greater than or equal to the structure of interest 302 may be included in the evaluation. Alternatively, surrounding objects with heights less than that of the structure of interest 302 may be included in certain embodiments.

In various other embodiments, if the surrounding objects include trees, the one or more processors may determine the density of surrounding objects by considering the trees including all of their foliage. Alternatively, the one or more processors may consider the trees including none or a portion of their foliage. As an example, for hurricane-prone regions, the highest likelihood of wind-originated damage may occur during hurricane season. Thus, determining the density of surrounding objects by considering the trees including all of their foliage may be most appropriate for those regions because hurricanes typically affect those regions during summer months.

For example, for area segment 308.1, the one or more processors may determine that the density of surrounding objects is low. In this example, for area segment 308.2, the one or more processors may determine that the density of surrounding objects is high. In various embodiments, the one or more processors may assign a rating to the density of surrounding objects, for example, a number ranging from 0 to 100. Alternatively, the one or more processors may assign any suitable rating from any suitable rating system.

At block 412, and in reference to FIG. 3, the one or more processors may determine a risk score for each of the plurality of area segments 308.1-308.8. The risk score may be based on the density of surrounding objects in each of the plurality of area segments 308.1-308.8. In various embodiments, the density of surrounding objects for a respective area segment of the plurality of area segments 308.1-308.8 may be inversely proportional to the risk score for the respective area segment. In further embodiments, the risk score for each of the plurality of area segments 308.1-308.8 may be based on the height of all surrounding objects of equal or greater height than the structure of interest 302. In yet another embodiment, the risk score for each of the plurality of area segments 308.1-308.8 may be weighted according to at least one of (i) one or more historic wind patterns 312 associated with the geographic region of the structure and (ii) a spacing from the structure of the surrounding objects.

For example, the one or more processors may determine risk scores for area segments 308.7 and 308.6. In this example, the one or more processors may use the density of surrounding objects from block 410, one or more historic wind patterns 312, spacing from the structure of the surrounding objects, and the height of the surrounding objects to determine the risk score. Further in this example, the one or more processors may determine the risk score for area segment 308.7 to be low because, as illustrated in FIG. 3, the surrounding objects in area segment 308.7 have a relatively high density, are close to the structure of interest 302, and are placed between the structure of interest 302 and the direction of the historic wind patterns 312. When determining the risk score for area segment 308.6, the one or more processors may determine the risk score for area segment 308.6 to be higher than the risk score for area segment 308.7 because, as illustrated in FIG. 3, the surrounding objects in area segment 308.6 are smaller than the surrounding objects in area segment 308.7, thus providing less protection from wind damage than the larger objects in area segment 308.7.

In another example, the one or more processors may determine risk scores for area segments 308.4 and 308.5. In this example, the one or more processors may determine the risk score for area segment 308.4 to be lower than the risk score for area segment 308.5 because the surrounding objects in area segment 308.4 are closer to the structure of interest 302 than the surrounding objects in area segment 308.5.

In yet another example, the one or more processors may determine a risk score for area segment 308.2. The one or more processors may determine the risk score for area segment 308.2 to be higher than the risk score associated with area segment 308.7, as previously mentioned, because the surrounding objects in area segment 308.2 are distributed more sparsely than the surrounding objects in area segment 308.7, thus providing less protection from wind damage than the more clustered objects in area segment 308.7.

In yet another example, the one or more processors may determine a risk score for area segment 308.8. The one or more processors may determine the risk score for area segment 308.8 to be relatively low because the surrounding objects are of equal or greater height than the structure of interest 302 and relatively close to the structure of interest. Moreover, the one or more processors may retrieve building records corresponding to the building illustrated in area segment 308.8 to determine, for example, the age of the building, how the building has been maintained, and if the building meets safety inspection standards. It should be understood that the information retrieved by the one or more processors may include the information described including more or less information as would be suitable in analyzing the survivability of a structure.

In a final example, the one or more processors may determine risk scores for area segments 308.1 and 308.3. The one or more processors may determine the risk scores for area segments 308.1 and 308.3 to be relatively high because neither area segment 308.1 nor 308.3 includes any surrounding objects.

It should be understood that the scoring system used by the one or more processors when determining a risk score may be relative or fixed scale. In other words, the scoring system may be based on the relative risk of each respective area segment when compared with the other respective area segments, or the scoring system may be based on a fixed scale using the metrics described above.

At block 414, the one or more processors provide an overall wind exposure risk value to an interested party, such as an owner of the structure or a prospective insurance provider. In various embodiments, the overall wind exposure risk value is based on a combination of the risk scores for each of the plurality of area segments, for example, the plurality of area segments 308.1-308.8. In various embodiments, the one or more processors may provide the overall wind exposure risk value to the owner of the structure via, for example, the user electronic device 150, or any other suitable device connected to the network 102. Additionally, the one or more processors may provide the overall wind exposure risk value to the prospective insurance provider via, for example, the control client 140, the server 110, or any other suitable device connected to the network 102.

With further reference to block 414 and FIG. 3, the overall wind exposure risk value may be generated by a weighted combination of the risk scores for each of the plurality of area segments 308.1-308.8. In various embodiments, each area segment may receive equal weight, or the area segments may have variable weighting factors based upon the location of the structure of interest 302 and the local environment. Thus, area segments 308.5-308.8 in the direction from which wind usually blows (based upon historic wind patterns 312) may be more heavily weighted (e.g., may be assigned larger weighting factors) than other area segments 308.1-308.4, as the risks associated with such windward area segments 308.5-308.8 are greater than those for leeward area segments 308.1-308.4.

As an example, for hurricane-prone regions, the winds of a hurricane may blow on a structure from multiple directions. In this example, certain area segments may have higher risk scores based on the known wind patterns of hurricanes in the region. Further in this example, a hurricane may blow on a structure from every direction and may heighten the risk score for every area segment (e.g., plurality of area segments 308.1-308.8).

At optional block 416, in embodiments where the overall wind exposure risk value is provided to the prospective insurance provider, the one or more processors may determine an insurance eligibility based on the overall wind exposure risk value. For example, an insurer may determine that the risk associated with wind damage is too high to issue a new policy or to renew an existing policy based upon the wind overall exposure risk value. An insurer may similarly limit the types or amounts of coverage offered for the structure. In some embodiments, the non-transitory computer executable instructions stored on the one or more memories of a computer device may cause the computer device to determine an insurance eligibility based on the overall wind exposure risk value.

For example, the prospective insurance provider may use the overall wind exposure risk value to determine an insurance eligibility by comparing the overall wind exposure risk value to the insurance provider's underwriting criteria for a given area. If the prospective insurance provider determines that the overall wind exposure risk value satisfies the underwriting criteria for the given area, the prospective insurance provider may conclude the structure (e.g., the structure of interest 302) is eligible for insurance coverage. Thus, the prospective insurance provider may choose to grant an owner of the structure (e.g., the structure of interest 302) or other interested party an insurance policy related to the structure.

Alternatively, if the prospective insurance provider determines the overall wind exposure risk value does not satisfy the underwriting criteria for the given area, the prospective insurance provider may conclude the structure is ineligible for insurance coverage. Thus, the prospective insurance provider may choose to deny an owner of the structure or other interested party an insurance policy related to the structure. In some embodiments, the insurance provider may determine one or more changes or adjustments to the local environment that may be made to improve the overall wind exposure risk value, such as planting trees in certain area segments.

At block 418, the one or more processors may update an insurance policy based on the overall wind exposure risk value. Updating the insurance policy may include determining a cost, premium, deductible, discount, or coverage level associated with insurance coverage for the structure of interest 302. For example, a low overall wind exposure risk value may be used to reduce the premium for an insurance policy covering a house surrounded by a large number of trees. In some embodiments, the non-transitory computer executable instructions stored on the one or more memories of a computer device may cause the computer device to update an insurance policy based on the overall wind exposure risk value.

For example, the insurance policy may be updated to include an adjustment to one or more aspects of the insurance policy (e.g., premium, deductible, or coverage). The insurance policy may be associated with the structure (e.g., the structure of interest 302) due to analysis such as that performed at optional block 416, or the insurance policy may be a pre-existing policy associated with the structure before any steps of the method 400 were performed. Updating the insurance premium may be performed based on a score or other metric where the overall wind exposure risk value is provided as a score or other quality metric. In some embodiments, updating an insurance policy may include generating an indication of the update to the insurance policy and causing such indication to be presented to a policyholder via a computer interface. In further embodiments, an update to the insurance policy may be implemented by a server (e.g., server 110), which may include generating policy documents and obtaining payment.

As will be apparent from the above description, and as should be appreciated with respect to all examples presented in this disclosure, various ones of the functions or operations shown in FIG. 4 are optional. Furthermore, the functions or operations shown in FIG. 4 may be performed in any suitable order, any desired number of times, and/or with any suitable variation to the particular order and/or combination shown so as to achieve a desired result, such as a desired manner of analyzing a survivability of a structure (e.g., the structure of interest 302).

VIII. Additional Considerations

The following additional considerations apply to the foregoing discussion. Throughout this specification, plural instances may implement functions, components, operations, or structures described as a single instance. As noted above, although individual functions and instructions of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The methods described in this application may include one or more functions or routines in the form of non-transitory computer-executable instructions that are stored in a tangible computer-readable storage medium and executed using a processor of a computing device (e.g., the user electronic device 150, the imaging vehicle 130, the control client 140, the server 110, and/or any other computing devices within the example system 100 in any suitable combination). The routines may be included as part of any of the modules described in relation to FIG. 1 or as part of a module that is external to the system illustrated by FIG. 1. For example, the methods or portions thereof may be part of a browser application(s) or an application(s) running on any of the devices in the example system 100 as a plug-in or other module of the browser application. Further, the methods may be employed as "software-as-a-service" to provide, for example, the user electronic device 150, the imaging vehicle 130, the control client 140, the server 110, and/or any other computing devices with access to the example system 100.

Additionally, certain aspects are described herein as including logic or a number of functions, components, modules, blocks, or mechanisms. Functions may constitute either software modules (e.g., non-transitory code stored on a tangible machine-readable storage medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain functions). A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules may provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and may operate on a resource (e.g., a collection of information).

The various operations of example functions and methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or functions described herein may be at least partially processor-implemented. For example, at least some of the functions of a method may be performed by one or processors or processor-implemented hardware modules. The performance of certain of the functions may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the functions may be performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In some example embodiments, the one or more processors or processor-implemented modules may be located in a single geographic region (e.g., within a home environment, an office environment, or a server farm). In other example embodiments, the one or more processors or processor-implemented modules may be distributed across a number of geographic regions.

Still further, the figures depict preferred embodiments of an example system 100 and methods for purposes of illustration only. One of ordinary skill in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and method for determining a quality of driving of a vehicle. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

To the extent that any meaning or definition of a term in this document conflicts with any meaning or definition of the same term in a document incorporated by reference, the meaning or definition assigned to that term in this document shall govern. Although the text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The patent claims at the end of this patent application are not intended to be construed under 35 U.S.C. § 112(f) unless traditional means-plus-function language is expressly recited, such as "means for" or "step for" language being explicitly recited in such claims. The systems and methods described herein are directed to an improvement to computer functionality, and improve the functioning of conventional computers.

What is claimed is:

1. A computer-implemented method for analyzing a survivability of a structure, the method comprising:
    scanning, using one or more processors, an area surrounding the structure to identify surrounding objects; and
    determining, using the one or more processors, an overall wind exposure risk value for the structure based on the surrounding objects in a plurality of area segments.

2. The method of claim 1, further comprising:
    determining, using the one or more processors, a distance extending radially from the structure to define an area surrounding the structure, wherein the area surrounding the structure is a circle and the distance extending from the structure is 1,500 feet, and wherein the surrounding objects include trees and buildings.

3. The method of claim 2, further comprising:
    segmenting, using the one or more processors, the area surrounding the structure to create the plurality of area segments, wherein the plurality of area segments includes eight equal-area segments.

4. The method of claim 1, further comprising:
    determining, using the one or more processors, eligibility of the structure for coverage under an insurance policy based on the overall wind exposure risk value; and
    updating, using the one or more processors, an aspect of the insurance policy based on the overall wind exposure risk value.

5. The method of claim 1, further comprising:
    determining, using the one or more processors, a density of surrounding objects of equal or greater height compared to the structure in each of the plurality of area segments; and
    determining, using the one or more processors, a risk score for each of the plurality of area segments, wherein the risk score for each respective area segment of the plurality of area segments is based on the density of surrounding objects of equal or greater height compared to the structure in each of the plurality of area segments and is inversely proportional to the density of the surrounding objects identified for the respective area segment.

6. The method of claim 1, further comprising:
    determining, using the one or more processors, a risk score for each of the plurality of area segments, wherein the risk score for each of the plurality of area segments is based on the height of all surrounding objects of equal or greater height than the structure.

7. The method of claim 1, further comprising:
    determining, using the one or more processors, a risk score for each of the plurality of area segments, wherein the risk score for each of the plurality of area segments is weighted according to at least one of (i) one or more historic wind patterns associated with a geographic region of the structure and (ii) a spacing from the structure of the surrounding objects.

8. The method of claim 1, further comprising:
    determining, using the one or more processors, a risk score for each of the plurality of area segments; and
    providing, using the one or more processors, the overall wind exposure risk value to a user of a client computing device, wherein the overall wind exposure risk value is based on a combination of the risk scores for each of the plurality of area segments.

9. A computer device for analyzing a survivability of a structure, the computer device comprising:
one or more processors; and
one or more memories coupled to the one or more processors,
the one or more memories including computer executable instructions stored therein that, when executed by the one or more processors, cause the computer device to:
scan an area surrounding the structure to identify surrounding objects, and
determine an overall wind exposure risk value for the structure based on the surrounding objects in a plurality of area segments.

10. The device of claim 9, wherein the computer executable instructions, when executed, further cause the device to:
segment the area surrounding the structure to create the plurality of area segments;
determine a distance extending radially from the structure to define an area surrounding the structure, wherein the area surrounding the structure is a circle and the distance extending from the structure is 1,500 feet, and wherein the surrounding objects includes trees and buildings.

11. The device of claim 9, wherein the computer executable instructions that cause the device to provide an overall wind exposure risk value to a user of a client computing device, further cause the device to:
determine eligibility of the structure for coverage under an insurance policy based on the overall wind exposure risk value; and
update an aspect of the insurance policy based on the overall wind exposure risk value.

12. The device of claim 9, wherein the computer executable instructions, when executed, further cause the device to:
determine a density of surrounding objects of equal or greater height compared to the structure in each of the plurality of area segments; and
determine a risk score for each of the plurality of area segments, wherein the risk score for each respective area segment of the plurality of area segments is based on the density of surrounding objects of equal or greater height compared to the structure in each of the plurality of area segments and is inversely proportional to the density of the surrounding objects identified for the respective area segment.

13. The device of claim 9, wherein the computer executable instructions, when executed, further cause the device to:
determine a risk score for each of the plurality of area segments, wherein the risk score for each of the plurality of area segments is based on the height of all surrounding objects of equal or greater height than the structure.

14. The device of claim 9, wherein the computer executable instructions, when executed, further cause the device to:
determine a risk score for each of the plurality of area segments, wherein the risk score for each of the plurality of area segments is weighted according to at least one of (i) one or more historic wind patterns associated with a geographic region of the structure and (ii) a spacing from the structure of the surrounding objects.

15. The device of claim 9, wherein the computer executable instructions, when executed, further cause the device to:
determine a risk score for each of the plurality of area segments; and
provide the overall wind exposure risk value to a user of a client computing device, wherein the overall wind exposure risk value is based on a combination of the risk scores for each of the plurality of area segments.

16. A non-transitory computer readable storage medium comprising computer executable instructions stored thereon for analyzing a survivability of a structure, wherein the instructions when executed on one or more processors cause the one or more processors to:
scan an area surrounding the structure to identify surrounding objects; and
determine an overall wind exposure risk value for the structure based on the surrounding objects in a plurality of area segments.

17. The computer readable storage medium of claim 16, wherein the computer executable instructions, when executed, further cause the one or more processors to:
segment the area surrounding the structure to create the plurality of area segments;
determine a distance extending radially from the structure to define an area surrounding the structure;
determine a density of surrounding objects of equal or greater height compared to the structure in each of the plurality of area segments; and
determine a risk score for each of the plurality of area segments, wherein the risk score for each respective area segment of the plurality of area segments is based on the density of surrounding objects of equal or greater height compared to the structure in each of the plurality of area segments and is inversely proportional to the density of the surrounding objects identified for the respective area segment.

18. The computer readable storage medium of claim 16, wherein the computer executable instructions, when executed, further cause the one or more processors to:
determine a risk score for each of the plurality of area segments, wherein the risk score for each of the plurality of area segments is based on the height of all surrounding objects of equal or greater height than the structure.

19. The computer readable storage medium of claim 16, wherein the computer executable instructions, when executed, further cause the one or more processors to:
determine a risk score for each of the plurality of area segments, wherein the risk score for each of the plurality of area segments is weighted according to at least one of (i) one or more historic wind patterns associated with a geographic region of the structure and (ii) a spacing from the structure of the surrounding objects.

20. The computer readable storage medium of claim 16, wherein the computer executable instructions, when executed, further cause the one or more processors to:
determine a risk score for each of the plurality of area segments, wherein the overall wind exposure risk value is based on a combination of the risk scores for each of the plurality of area segments;
determine eligibility of the structure for coverage under an insurance policy based on the overall wind exposure risk value;
provide the overall wind exposure risk value to a user of a client computing device; and
update an aspect of the insurance policy based on the overall wind exposure risk value.

* * * * *